| United States Patent [19] | [11] Patent Number: 4,565,714 |
|---|---|
| Koshar | [45] Date of Patent: Jan. 21, 1986 |

[54] LOW SURFACE ENERGY MATERIAL

[75] Inventor: Robert J. Koshar, Mahtomedi, Minn.

[73] Assignee: Minnesota Mining and Manufacturing Company, St. Paul, Minn.

[21] Appl. No.: 620,438

[22] Filed: Jun. 14, 1984

[51] Int. Cl.$^4$ ............................................. B05D 3/06
[52] U.S. Cl. .................... 427/54.1; 427/35; 427/36; 427/387; 428/447; 528/15; 528/25; 528/26; 528/27; 528/31; 528/28; 522/172
[58] Field of Search ........................ 528/25, 26, 27, 28, 528/31, 15; 204/159.13; 427/54.1, 35, 36, 387; 428/447

[56] References Cited

U.S. PATENT DOCUMENTS

| 3,159,662 | 12/1964 | Ashby | 260/448.2 |
|---|---|---|---|
| 3,220,972 | 11/1965 | Lamoreaux | 260/46.5 |
| 3,230,289 | 1/1966 | Eder et al. | 264/216 |
| 3,318,852 | 5/1967 | Dixon | 260/78.5 |
| 3,410,886 | 11/1968 | Joy | 260/448.2 |
| 3,536,749 | 10/1970 | Groves | 260/481 |
| 3,565,750 | 2/1971 | Evans | 161/208 |
| 3,729,444 | 4/1973 | Bey et al. | 260/46.5 |
| 3,810,874 | 5/1974 | Mitsch et al. | 260/75 |
| 4,057,596 | 11/1977 | Takamizawa et al. | 260/825 |
| 4,085,137 | 4/1978 | Mitsch et al. | 528/25 |
| 4,216,252 | 8/1980 | Moeller | 427/38 |
| 4,321,404 | 3/1982 | Williams et al. | 560/115 |
| 4,504,645 | 3/1985 | Melancon | 528/25 |

Primary Examiner—Melvyn I. Marquis
Attorney, Agent, or Firm—Donald M. Sell; James A. Smith; Lorraine R. Sherman

[57] ABSTRACT

A low surface energy material is a hydrosilation reaction product of an ethylenically-unsaturated perfluoropolyether with a compound containing silicon-bonded hydrogen. A substrate bearing the low surface energy coating of the invention can be used in low-adhesion articles, for example, in adhesive tapes, for cooking utensils, ice-release for aircraft, or for magnetic recording media.

26 Claims, No Drawings

LOW SURFACE ENERGY MATERIAL

FIELD OF THE INVENTION

This invention relates to a low surface energy material that is a hydrosilation reaction product of a compound containing fluorine and aliphatic unsaturation with a compound containing silicon-bonded hydrogen. In another aspect, the invention relates to a substrate bearing a low surface energy coating of the hydrosilation reaction product.

BACKGROUND OF THE INVENTION

Pressure-sensitive adhesive tape which is wound upon itself in roll form generally has a low-adhesion backsize coating to permit the tape to be unwound without delaminating. The force required to separate such a tape from the low-adhesion backsize coating typically ranges from 150 to 900 grams per 2.5 cm of width. If the tape is not wound upon itself or is an adhesive transfer tape in roll form, its adhesive coating is customarily protected by a disposable web which likewise has a low-adhesion coating to which normally tacky and pressure-sensitive adhesives adhere very weakly, e.g., a peel force of about 5 to 150 grams per 2.5 cm width and preferably 5 to 50 grams. This construction is useful for products such as adhesive coated labels or large adhesive coated sheets or in adhesive transfer tape construction. U.S. Pat. Nos. 3,230,289, 3,565,750 and 3,729,444 are illustrative of such products. Any such low-adhesion coating must both adhere strongly to its underlying substrate and be sufficiently cured or rendered incompatible with the adhesive so that it does not contaminate the adhesive, i.e., does not transfer into the adhesive and interfere unduly with its adhesiveness. Low-adhesion backsize coatings are disclosed, for example, in U.S. Pat. Nos. 3,318,852; 3,536,749; 4,057,596 and 4,216,252.

Certain pressure-sensitive adhesives, particularly those prepared from polydimethylsiloxane, are so aggressively tacky that tapes containing them require undesirably high peel forces to remove them from known low-adhesion coatings, especially after prolonged storage. The adhesives of such tapes may carry away and thus be contaminated by appreciable amounts of the low-adhesion material. Known low-adhesion coatings, e.g., polyurethane, polytetrafluoroethylene, and polydimethylsiloxanes, are especially ineffective for providing a peel force in the range of 5 to 50 grams per 2.5 cm width with polydimethylsiloxane adhesives.

Low-adhesion coatings have other uses, e.g., nonstick coatings for cooking utensils, ice-releasing coatings for aircraft, and lubricative coatings for magnetic recording media. Such low-adhesion coatings are sometimes called "release coatings", a term which also encompasses release agents for molds, which generally are effective only by failing cohesively. Lubricants that are uncured fluids or waxes usually function by cohesive failure. The release coatings of this invention are cured compositions which are designed to resist cohesive failure. To distinguish release coatings which are designed to fail cohesively from those which are designed to resist cohesive failure, the latter are herein called "liners" and, more specifically, "low surface energy liners" because low surface energy is important to their effectiveness.

Polyorganohydrosiloxanes useful for preparing the low surface energy coatings of the present invention are known in the art and are disclosed in U.S. Pat. Nos. 3,159,662; 3,220,972, and 3,410,886.

Ethylenically-unsaturated perfluoropolyether monomers useful in undergoing hydrosilation in the process of the present invention are disclosed in U.S. Pat. Nos. 3,810,874 and 4,321,404.

SUMMARY OF THE INVENTION

The present invention provides a composition that can be cured to a low surface energy material that in coating form is effective as a release surface for use with the most aggressive class of adhesives known in the art or for other applications requiring low adhesion.

Briefly, the composition of the invention that can be cured to a low surface energy material comprises (1) a polyorganohydrosiloxane comprising at least two hydrogen atoms attached to silicon atom(s), with no more than two hydrogen atoms being on any one silicon atom and a number average molecular weight of from 106 to about 50,000;

(2) an ethylenically-unsaturated perfluoropolyether monomer having segments comprising a plurality of repeating units of the formula $-C_aF_{2a}O-$, in which "a" in each unit is independently an integer of 1 to 4, and at least one ethylenically-unsaturated group, the monomer preferably having a number average molecular weight of at least 500, most preferably 500 to 20,000; and (3) an effective amount of a hydrosilation catalyst for bringing about the condensation of the polyorganohydrosiloxane and the ethylenically-unsaturated perfluoropolyether monomer.

In another aspect, the invention provides a process for providing a substrate with a low surface energy coating, i.e., a low surface energy liner, comprising the steps of (1) coating the substrate with the composition as defined above and (2) exposing the coated substrate to suitable energy, such as heat or actinic radiation, to effect hydrosilation of the polyorganohydrosiloxane with the ethylenically-unsaturated perfluoropolyether monomer.

In a further aspect, the invention provides a low surface energy liner prepared by the above-described process. Release performance of the linear toward adhesives using a 180° peel test (described below) are in the range of about 5 to 900 grams per 2.5 cm of width.

In the present invention:

"hydrosilation" means a reaction involving the addition of a silicon-hydrogen group across a pair of aliphatic unsaturated carbon atoms, i.e., carbon atoms joined by double bonds; the reaction can be illustrated by the following general equation:

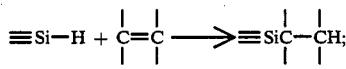

"polyorganohydrosiloxane" means a silicon-containing compound having a molecular weight in the range of 106 to 50,000 that has at least two silicon atoms that are joined together through an oxygen atom and incorporated into a linear or branched chain or a cyclic structure in which at least two of the bonds to silicon atoms, not attached to oxygen, are attached to hydrogen and each remaining bond is attached to a carbon atom of an organic group;

"perfluoropolyether" means a polyether, i.e., a compound having a chain of at least two alkoxy groups, the alkyl groups, which can be branched or straight chain, of which are completely fluorinated and contain 1 to 4 carbon atoms;

"actinic radiation" means any effective radiation and, as used in this application, includes UV and visible radiation and also electron beam radiation;

"catenary" means in the backbone and not a pendant or terminal group; and

"low surface energy" means a material, such as perfluoropolyether, where the molecular attraction forces for other materials, e.g., known adhesives and other organic polymers, are low.

"flexible" means capable of being bent through an angle of 90° without fracture.

DETAILED DESCRIPTION OF THE INVENTION

The polyorganohydrosiloxane useful in the hydrosilation reaction of the present invention comprises at least two hydrogen atoms attached to silicon atoms, with no more than 2 hydrogen atoms being on any one silicon atom, the polyorganohydrosiloxane preferably having a molecular weight in the range of 106 to 50,000. Preferably, the organic group is a straight chain group and has one to twelve carbon atoms or is branched or cyclic and has 3 to 12 carbon atoms and optionally up to 3 catenary oxygen atoms (no two of which are attached together). The smallest such compound has the formula:

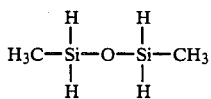

and a molecular weight of 106.

Polyorganohydrosiloxanes that can be used in the composition of the invention include cyclopolyorganohydrosiloxanes having the empirical formula

   II and the preferred linear and branched polyorganohydrosiloxanes having the general formula

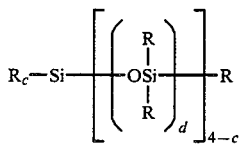   III wherein
each R can be independently hydrogen or a substituted or unsubstituted organic group selected from linear alkyl groups having 1 to 12 carbon atoms, branched alkyl or cycloalkyl groups having 3 to 7 carbon atoms, alkoxyalkyl groups having 1 to 3 carbons in the alkoxy group, and phenyl groups, the substituting group(s) being selected from one or more halogen (i.e., chlorine, fluorine, bromine), $C_1$ to $C_4$ alkyl groups, trifluoroalkyl, alkyl- and fluoroalkylcarbonylamido and -sulfonamido groups in which the alkyl group is linear, branched, or cyclic (preferably linear) having one to 18 carbon atoms;

and at least two but not more than 70 percent of all R groups are hydrogen;
b is an integer having a value of 3 to 18;
c has a value of 0, 1, 2, or 3; and
d is an integer having a value of 1 to about 300.

As mentioned above, the polyorganohydrosiloxanes and their preparation are well known in the art and are disclosed, for example, in Ashley, U.S. Pat. No. 3,159,662; Lamoreaux, U.S. Pat. No. 3,220,972; and Joy, U.S. Pat. No. 3,410,886, which are incorporated herein by reference.

The polyorganohydrosiloxane compounds or polymers having structural units represented by formulas II or III above are normally fluid organopolysiloxanes which are preferably, but not necessarily, free of olefinic unsaturation in group R, but which contain silanic hydrogen. Among the organic group which R represents are alkyl, such as methyl, ethyl, propyl, isopropyl, butyl, octyl, and dodecyl; cycloalkyl, such as cyclopentyl, cyclohexyl, and cycloheptyl; aryl, such as phenyl, naphthyl, tolyl, and xylyl; aralkyl, such as benzyl, phenylethyl, and phenylpropyl; halogenated derivatives of the aforesaid radicals such as chloromethyl, trifluoromethyl, 3,3,3-trifluoropropyl, chloropropyl, chlorophenyl, dibromophenyl, tetrachlorophenyl, and difluorophenyl; sulfonamidoalkyl compounds such as 3-(N-ethylperfluorooctanesulfonamido)propyl; cyanoalkyl, such as beta-cyano ethyl, gamma-cyanopropyl, and beta-cyanopropyl. R is preferably methyl. Formula II and III are intended to include those substances wherein R is a combination of the aforesaid organic groups to provide a variety of structural units. Other polyorganohydrosiloxanes useful in this invention are listed in Walter Noll, "Chemistry and Technology of Silicones", pp. 262, 270, and 279, Academic Press, NY (1968).

Materials specifically encompassed within formulas II and III above include 1,3-dimethyldisiloxane, 1,1,3,3-tetramethyldisiloxane, tetrakis(dimethylsiloxy)silane, and the like as well as linear and branched polymers containing up to 1,000 or more silicon atoms per molecule. Also included within the scope of formula II above are cyclic materials, such as cyclic compounds of methyl hydrogen siloxane having the formula $(CH_3SiHO)_z$, wherein subscript z is an integer from 3 to 10. Particularly included is tetramethylcyclotetrasiloxane. Within the scope of formulas II and III are hydrogen siloxane units $(HSiO_{1.5})$, methyl hydrogen siloxane units $(HSiCH_3O)$, dimethyl hydrogen siloxane units $[HSi(CH_3)_2O_{0.5}]$, and dihydrogen siloxane units $(H_2SiO)$. Preferred polyorganohydrosiloxanes, because of their availability are the linear polymethylhydrosiloxanes having the structure:

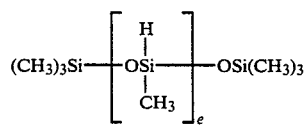

wherein e is an integer having a value of about 5 to 300.

Preferred ethylenically-unsaturated perfluoropolyether monomers of use in the composition of the invention have the formula

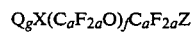   IV wherein
Q is an ethylenically-unsaturated group having the formula

in which $R^1$ and $R^2$ are independently hydrogen, alkyl, phenyl, phenylalkyl, or alkylphenyl in which alkyl has 1 to 4 carbon atoms and is linear, branched, or cyclic, and preferably $R^1$ and $R^2$ are hydrogen;

g is an integer having a value of 1 or 2;

X is a polyvalent linking group linking one or two Q groups to a perfluoropolyether segment; X is divalent when g is one and trivalent when g is two;

$(C_aF_{2a}O)_fC_aF_{2a}$ is a perfluoropolyether segment comprising a chain of f units, $(C_aF_{2a}O)$, in which "a" in each unit is independently an integer of 1 to 4 and f is a number having a value of at least two, preferably an average of about 3 to 500; and Z is $-OC_aF_{2a+1}$ or $-XQ_g$ and Z is preferably $-XQ_g$ in which a, X, Q and g are as defined above.

In the above definition of the ethylenically-unsaturated perfluoropolyether monomers, any known connecting groups can be used so long as they do not interfere with the hydrosilation process, i.e., sulfur-containing compounds can poison the catalyst. These linking groups X generally have a molecular weight of less than 500, preferably less than 200 and can be composed of atoms selected from carbon, hydrogen, oxygen, and nitrogen. Examples of linking groups are:

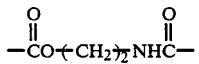

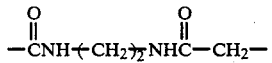

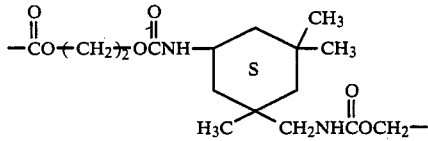

—CH₂OCH₂—

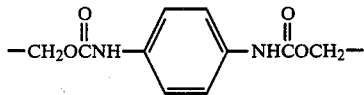

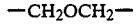

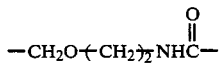

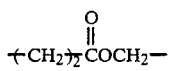

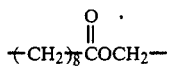

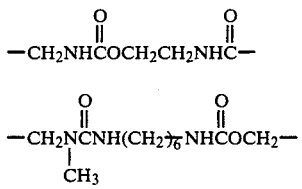

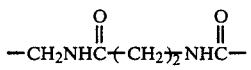

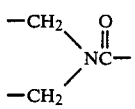

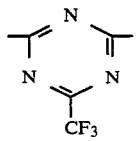

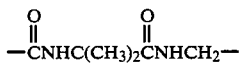

—CNHC(CH₃)₂CNHCH₂—

Other examples of connecting groups and the preparation of ethylenically-unsaturated perfluoropolyethers containing them are disclosed in U.S. Pat. No. 3,810,874 and in Assignee's copending application Ser. No. 340,473, now U.S. Pat. No. 4,440,918 both of which are incorporated herein by reference for this disclosure of perfluoropolyethers.

More preferred ethylenically-unsaturated perfluoropolyether monomers of use in the composition of the invention are compounds of formula IV in which the connecting group, X, is selected from

—CH₂OCH₂—,

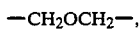

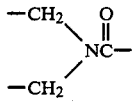

Illustrative of the more preferred of the ethylenically-unsaturated perfluoropolyether monomers of formula IV are the monomers having the formulae

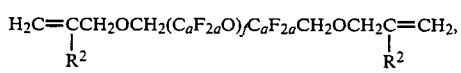  V

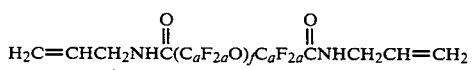  VI and

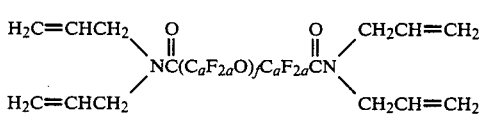  VII wherein a, $R^2$, and f are as defined above.

Particularly preferred are the ethylenically-unsaturated perfluoropolyether monomers of the formula $$H_2C=CHCH_2OCH_2CF_2O(CF_2CF_2O)_m(CF_2O)_nCF_2CH_2OCH_2CH=CH_2 \quad \text{VIII}$$

wherein m and n are numbers designating the number of randomly distributed perfluoroethyleneoxy and perfluoromethyleneoxy repeating units, respectively, m and n independently have values from 1 to 300 and the ratio m/n is 0.2/1 to 5/1.

Examples of perfluoropolyether monomers of formula IV useful for making the low-energy coating of the invention are listed in TABLE I below, where, as elsewhere, the perfluoroalkylene oxide units are randomly distributed, the given numbers of which are average values.

TABLE I

Perfluoropolyether Monomers

1. $H_2C=CHCOCH_2CH_2NHCCFO(CF_2CFO)_3CF_2CF_2CF_2(OCFCF_2)_3OCFCNHCH_2CH_2OCCH=CH_2$
   with $CF_3$ substituents (four)

2. $H_2C=CHCOCH_2CF_2O(CF_2CF_2O)_8(CF_2O)_{14}CF_2CH_2OCCH=CH_2$

3. $H_2C=CCOCH_2CF_2O(CF_2CF_2O)_{16}(CF_2O)_{28}CF_2CH_2OCC=CH_2$
   with $CH_3$ substituents

4. $H_2C=CHCH_2OCH_2CF_2O(CF_2CF_2O)_{16}(CF_2O)_{28}CF_2CH_2OCH_2CH=CH_2$

5. $H_2C=CHCH_2NHC(CF_2CF_2O)_8(CF_2O)_{14}CF_2CNHCH_2CH=CH_2$

6. $H_2C=CHCH_2$ \ $NC(CF_2CF_2O)_8(CF_2O)_{14}CF_2CN$ / $CH_2CH=CH_2$
   $CH_2=CHCH_2$ /       \ $CH_2CH=CH_2$

7. $H_2C=CHCH_2OCH_2CF_2O(CF_2CF_2O)_{14}(CF_2O)_{70}CF_2CH_2OCH_2CH=CH_2$
8. $H_2C=CHCH_2OCH_2CF_2O(CF_2CF_2O)_{80}(CF_2O)_{140}CF_2CH_2OCH_2CH=CH_2$

9. $H_2C=CHCH_2O(CH_2)_2NHC(CF_2CF_2O)_{30}(CF_2O)_6CF_2CNH(CH_2)_2OCH_2CH=CH_2$

10. $H_2C=CHCO(CH_2)_2NC(CF_2CF_2O)_{17}(CF_2O)_{30}CF_2CN(CH_2)_2OCCH=CH_2$
    with $CH_3$ substituents 11. [Structure with two trimethylcyclohexyl-S rings connected via $CH_2NHCO(CH_2)_2NHCCF_2O(CF_2CF_2O)_8(CF_2O)_{14}CF_2$ linkage, with $NHCOCH_2CH=CH_2$ groups and $CH_2NHCO(CH_2)_2NHC=O$]

TABLE I-continued
Perfluoropolyether Monomers

12. $H_2C{=}CHCO(CH_2)_2NHCCF_2O(CF_2CF_2O)_8(CF_2O)_{14}CF_2CNH(CH_2)_2OCCH{=}CH_2$ (with four C=O groups)

13. $H_2C{=}CHCNHC(CH_3)_2CNHCH_2CF_2O(CF_2CF_2O)_8(CF_2O)_{14}CF_2CH_2NHCC(CH_3)_2NHCCH{=}CH_2$ (with four C=O groups)

14. $H_2C{=}CHCH_2OCCF_2O(CF_2CF_2O)_8(CF_2O)_{14}CF_2COCH_2CH{=}CH_2$ (with two C=O groups)

15. $H_2C{=}CHCH_2{-}\langle\text{phenyl}\rangle{-}NHCCF_2O(CF_2CF_2O)_8(CF_2O)_{14}CF_2CNH{-}\langle\text{phenyl}\rangle{-}CH_2CH{=}CH_2$

16. $H_3CCH{=}CHCH_2OCCF_2O(CF_2CF_2O)_8(CF_2O)_{14}CF_2COCH_2CH{=}CHCH_3$

17. $\langle\text{phenyl}\rangle{-}CH{=}CHCOCH_2CF_2O(CF_2CF_2O)_8(CF_2O)_{14}CF_2CH_2OCCH{=}CH{-}\langle\text{phenyl}\rangle$ 18. $H_{25}C_{12}CH{=}CHCOCH_2CF_2O(CF_2CF_2O)_8(CF_2O)_{14}CF_2CH_2OCCH{=}CHC_{12}H_{25}$ 19. $H_2C{=}CCOCH_2CF_2O(CF_2CF_2O)_8(CF_2O)_{14}CF_2CH_2OCC{=}CH_2$ (with phenyl substituents on each C)

---

The compounds of formula IV are ethylenically-unsaturated compounds, preferably esters, amides, or ethers or they have a combination of these groups. They can be prepared from perfluoropolyetheralkanoles, -alkylamines, -carboxylic acids, halides, or ester or -carboxamidols by esterification, amidation, or etherification reactions that are well known to the skilled chemist. Thus, the ethylenically-unsaturated perfluoropolyether monomers of formula IV are conveniently prepared from corresponding alkyl esters, e.g.,

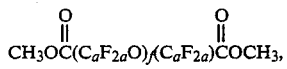

$$CH_3OC(C_aF_{2a}O)_f(C_aF_{2a})COCH_3,$$

where a and f are defined above by various reactions known in the art. For example, reaction of the above dimethyl esters with ethylenically-unsaturated primary or secondary amines, such as allylamine or diallylamine, provide ethylenically-unsaturated amides such as represented by formulae VI and VII. Methylol-terminated perfluoropolyethers, e.g., $HOCH_2(C_aF_{2a}O)_f(C_aF_{2a})CH_2OH$, are useful intermediates to other monomers of formula IV and are prepared by reduction of the above esters, e.g., by reaction with lithium aluminum hydride or sodium borohydride. Reaction of these alcohols with ethylenically-unsaturated halides, e.g., allyl bromide, in the presence of sodium hydride or potassium hydroxide provides ethylenically-unsaturated perfluoropolyethers such as represented by formulae V and VIII. The perfluoropolyether alcohols can also be reacted with the acyl halide, anhydride or lower alkyl esters of acrylic or methacrylic acid or an isocyanatoalkyl acrylate or methacrylate, e.g., 2-isocyanatoethyl methacrylate, or an unsaturated isocyanate, e.g., allyl isocyanate, to provide ethylenically-unsaturated perfluoropolyethers. Another useful method for preparation of compounds of formula IV is the reaction of two moles of an organic diisocyanate and two moles of a hydroxyalkyl acrylate with a perfluoropolyether diol such as a methylol-terminated perfluoropolyether having the formula described above.

Further description of the preparation of the ethylenically-unsaturated perfluoropolyether monomers useful in hydrosilation reaction of the present invention is to be found in the disclosure of U.S. Pat. Nos. 3,810,874 and 4,321,404 which are incorporated herein by reference.

In general, the curable compositions contain from 2 to 35 weight percent of the polyorganohydrosiloxanes of formulae II or III with from 65 to 98 weight percent of the ethylenically-unsaturated perfluoropolyethers of formula IV, the weight percent being based on the weight of the total composition. For each composition, the force required to separate an adhesive from the release coating, can be varied from a value of less than about 10 g/2.5 cm of width to a higher value of about 20 to 400 g/2.5 cm or more by changing the weight ratio of the above components. For example, the use of the higher weight percent of the perfluoropolyether component generally provides the lower peel force value with pressure-sensitive adhesives. The weight percent of the above components used to provide effective, cured coatings is also dependent on the equivalent weight of each of the components, i.e., the mole ratio of the SiH to the ethylenically-unsaturated functional group. A mole ratio of about 0.5 to 1.3 generally provides effective coatings.

The hydrosilation catalysts employed in the compositions of the present invention include all of the well-known metal-containing catalysts which are effective for catalyzing a hydrosilation reaction between silicon-bonded hydrogen groups and ethylenically-unsaturated groups. These materials include, for example, the finely divided platinum catalysts, such as those described in U.S. Pat. No. 2,970,150, the chloroplatinic acid catalysts described in U.S. Pat. No. 2,823,218, the platinum hydrocarbon complexes taught in U.S. Pat. Nos. 3,159,601, 3,159,662, as well as the platinum alcoholate catalysts described in U.S. Pat. No. 3,220,972, and platinum complexes having an ultraviolet displaceable group such as are disclosed in Assignee's copending patent application Ser. No. 472,158 filed Mar. 4, 1983 now U.S. Pat. No. 4,530,879 and the (cyclopentadienyl)(trialiphatic)platinum complexes such as are disclosed in Assignee's copending patent application Ser. No. 558,617 filed Dec. 6, 1983 now U.S. Pat. No. 4,510,094. In addition, the platinum chloride-olefin complexes described in U.S. Pat. No. 3,416,946 are useful herein. All of the teachings of hydrosilation catalysts in the aforesaid U.S. patents are incorporated herein by reference.

When a platinum catalyst is employed, it is generally present in an amount related to the amount of the ethylenically-unsaturated radicals in the perfluoropolyether monomer and in an amount sufficient to cause the co-reaction of the ethylenically-unsaturated perfluoropolyether monomer and the polyorganohydrosiloxane. Satisfactory results may be obtained when the platinum catalyst is present in amounts sufficient to provide as little as one part by weight of platinum per million parts by weight of perfluoropolyether monomer. On the other hand, amounts of the platinum catalyst sufficient to provide as high as one to ten parts by weight of platinum per 1,000 parts of perfluoropolyether monomer may also be used. In general, however, it is preferred to employ the platinum catalyst in an amount sufficient to provide one to two hundred parts by weight of platinum per one million parts by weight of perfluoropolyether monomer. Also, metals such as rhodium, iridium, and palladium, and their compounds, are known to catalyze these hydrosilation reactions and their use is intended to be within the scope of the present invention. Platinum compounds are the preferred catalysts.

The composition of the invention can also contain other ingredients such as hydrosilation inhibitors, dyes, pigments, and reinforcing fillers, e.g., carbon black, fumed silica, titanium dioxide, etc. Furthermore, the release character of the cured composition can be modified, i.e., the value of the force required to separate an adhesive from the surface of the cured composition can be increased by any method known in the art, e.g., by the method described previously, by the addition to the composition of 0.1 to 10 parts of a release modifier per 100 parts of the composition, or by use of different primers. Preferably the release modification provides a differential release of at least 10 percent. Such modifiers are known and include, for example, tetraalkoxyalkyl silicates such as $Si(OC_2H_4OC_2H_5)_4$, such as are described in U.S. Pat. No. 3,518,325; graft polymers having a polyorganosiloxane segment and an organic polymer segment as are described in U.S. Pat. No. 4,366,286; vinyl terminated diorganopolysiloxanes in which 3 to 39 mole percent of the diorgano units are nonterminal diphenylsiloxane units; and the three-dimensional toluene soluble silicate resins, known in the silicate art as MQ resin which are described in U.S. Pat. Nos. 2,676,182 and 2,857,356.

The low surface energy material of the invention can be applied to a substrate by the steps of (a) providing a composition of the polyorganohydrosiloxane, the ethylenically-unsaturated perfluoropolyether monomer, the hydrosilation catalyst, and optionally other additives either with or without solvents, such as at least one halogen-containing organic solvent, (b) coating the composition onto a substrate, (c) removing the solvent when used, and (d) curing the composition by application of heat at 25° to 150° C. or actinic radiation depending on the hydrosilation catalyst in the mixture, for a suitable period of time from a fraction of a second to five minutes or more.

Preferred solvents that can be used in the such as 1,1,2-trichlorotrifluoroethane and perfluorooctane.

Suitable substrates onto which the composition can be coated and cured include sheets, fibers, and materials of other shapes. Preferred substrates are flexible sheet materials that are used for pressure-sensitive adhesive products including polyester, polyamide, polyolefin, and polycarbonate films. Other substrates onto which the composition can be coated and cured include glass, ceramic, metal, and rubber.

The coating techniques useful in the process of the invention include brushing, wire or knife coating, spraying, curtain coating, and gravure coating having, for example, 80 lines per centimeter.

Where the cured coating does not adhere readily to the substrate, it may be desirable to apply to the substrate first a primer or an adhesion-promoting coating or treatment as is well known in the art.

Preferably, the primers are a coating of a suspension of colloidal particles in the form of a sol and optionally contain a binder resin. Examples of such coatings combine hydrated oxides of one or more elements such as hydrated silica, alumina, tungsten oxide, ferric oxide, or titanium oxide as is taught in U.S. Pat. No. 2,366,516, and combinations thereof; polymeric organosilicone compositions as taught in U.S. Pat. No. 2,721,855; a mixture of tetraalkoxysilane, or a partial hydrolyzate thereof, and a tetraalkyl titanate as is taught in U.S. Pat. No. 3,794,556; and an organosilane and a hydrolyzable titanium compound as is taught in U.S. Pat. No. 3,321,350.

The substrate bearing on one or both surfaces a coating of the cured composition of the invention can then be coated with any of the adhesives known in the art including the acrylic adhesives, the rubber based adhesives and the silicone adhesives. The adhesive-coated substrate can then be rolled upon itself, if desired. Pressure-sensitive, flexible, adhesive-coated sheet materials are well known in the art. For example, U.S. Pat. No. Re. 24,906 (acrylate), U.S. Pat. Nos. 2,857,356, 2,814,601, and 2,736,721 (siloxane), and U.S. Pat. No. 3,925,283 (urethane) disclose adhesive-coated materials which use particularly desirable pressure-sensitive adhesives.

The release performance of the coating toward adhesives can be measured by various methods known in the art depending upon whether the final product is in sheet or rolled form such as a tape. Various test methods for pressure-sensitive tapes are reported by the Pressure-Sensitive Tape Council (PSTC), "Test Methods for Pressure-Sensitive Tapes" (several editions). The peel values shown in the Examples were obtained by using a peel rate of 230 cm/min and a peel angle of 180°.

The release value of the cured perfluoropolyether-coated substrates prepared in the following Examples was determined by the following procedure:

A test pressure-sensitive adhesive tape having a polydimethylsiloxane pressure-sensitive adhesive is pressed against the surface of the perfluoropolyether coating using a 1.5 kg rubber roller to produce a laminate consisting of a pressure-sensitive adhesive tape and the cured perfluoropolyether coated substrate. The laminate is cut into 2.5×25 cm strips. The "release value" is the force (peel force) required to pull the test tape with adhesive adhered thereto away from the perfluoropolyether-coated substrate at an angle of 180° and a pulling speed of 230 cm/min.

The readhesion values of the pressure-sensitive tape is determined by the following procedure:

The pressure-sensitive tape, as removed from the perfluoropolyether-coated substrate is applied to the surface of a clean glass plate using a 2 kg rubber roller. The readhesion value is measured by pulling the tape from the glass surface at an angle of 180° and a stripping speed of 230 cm/min.

Objects and advantages of this invention are further illustrated by the following Examples, but the particular materials and amounts thereof recited in these examples, as well as other conditions and details, should not be construed to unduly limit this invention.

EXAMPLE 1

A solution containing 2.05 g of an allyl ether-terminated perfluoropolyether, $$CH_2=CHCH_2OCH_2CF_2O(C_2F_4O)_m(CF_2O)_nCF_2CH_2OCH_2CH=CH_2,$$

having a number average molecular weight (Mn) of about 2000 and m/n ratio of 0.5, 0.002 g of a platinum complex in divinyltetramethyldisiloxane (added as a solution containing 15 weight percent platinum), such as is described in U.S. Pat. No. 3,775,452 (EXAMPLE 1), and 15 ml of 1,1,2-trichlorotrifluoroethane was stirred in a closed vial at 25° C. for 15 hr. A solution of 0.075 g of a trimethylsilyloxy-terminated polymethylhydrosiloxane (DC-1107 from Dow Corning) and 8 ml of 1,1,2-trichlorotrifluoroethane was added. A silica-titanium dioxide primed poly(ethylene terephthalate) film was coated with the above solution using a No. 3 RDS rod (R. D. Specialties Inc.). The film was then heated in an oven at 95° C. for 5 min. The side of the film, containing the cured coating, was laminated with a test tape having a polydimethylsiloxane pressure-sensitive adhesive. The initial peel force was 10–15 g/2.5 cm. After heat aging of the laminate at 70° C. (24 hr), the peel force was 30–40 g/2.5 cm and the readhesion value (glass), which measured the adhesion of the silicone adhesive after contact with the release coating, was 1120–1180 g/2.5 cm. For comparison, the adhesion of the test tape prior to contact with the release coating was 1100–1120 g/2.5 cm.

The silica-titanium dioxide primed poly(ethylene terephthalate) film was prepared by reverse roll coating a 62.5 micrometer thick poly(ethylene terephthalate) film with a solution of 94 parts by weight of anhydrous ethanol, 3 parts of glacial acetic acid, and 3 parts of tetraisopropyl titanate. The coated film was then dried at about 90° C. for 1.5 to 2 minutes and overcoated with a 50% by volume aqueous ethanol solution containing about 0.5% by weight of Ludox TM LF (DuPont), i.e., colloidal silica. The coating was then dried at about 95° C. for 1.5 to 2 minutes. Similar results were obtained using substrates that had been primed using alcoholic solutions that were 1 to 10% by weight in both tetraisopropyl titanate and colloidal silica.

EXAMPLE 2

Using the coating solution and procedures described in EXAMPLE 1, an unprimed poly(ethyleneterephthalate) film was coated and heated at 95° C. for 5 min. The peel force and readhesion value, after heat aging of the laminate was 100–110 g/2.5 cm and 1090–1120 g/2.5 cm, respectively.

EXAMPLE 3

Using procedures described in EXAMPLE 1, a solution containing 1.15 g of the ethylenically-unsaturated perfluoropolyether $$CH_2=CH-CH_2NH\overset{O}{\overset{\|}{C}}CF_2O(C_2F_4O)_m(CF_2O)_nCF_2\overset{O}{\overset{\|}{C}}NHCH_2CH=CH_2,$$

having a number average molecular weight of 2000 and m/n ratio of 0.5, 0.002 g of the platinum catalyst solution described in EXAMPLE 1, 0.1 g of DC-1107, and 15 ml of 1,1,2-trichlorotrifluoroethane was coated on a poly(vinylidene chloride)—primed poly(ethylene terephthalate) film using a No. 3 RDS rod. The film was then heated at 95° C. for 5 min. After heat aging (70° C. for 24 hr) of a laminate, prepared from the silicone adhesive test tape described in EXAMPLE 1, the peel force was 60–90 g/2.5 cm and the readhesion value was 950–980 g/2.5 cm.

EXAMPLE 4

A solution containing 2.0 g of the perfluoropolyether diacrylate, $$CH_2=CH\overset{O}{\overset{\|}{C}}OCH_2CF_2O(C_2F_4O)_m(CF_2O)_nCF_2CH_2O\overset{O}{\overset{\|}{C}}CH=CH_2,$$

having a number average molecular weight of about 1900 and m/n ratio of 0.5, 0.002 g of the platinum catalyst solution described in EXAMPLE 1, 0.2 g of the polymethylhydrosiloxane fluid, DC-1107, and 20 ml of 1,1,2-trichlorotrifluoroethane was coated on a poly(vinylidene chloride)—primed poly(ethylene terephthalate) film (No. 3 RDS rod). The coated film was then heated at 90° C. for 10 min. The peel force of the laminate, prepared from the test tape described in EXAMPLE 1, was 170–220 g/2.5 cm and the readhesion value was 895–960 g/2.5 cm.

EXAMPLE 5

This example demonstrates the release performance of an allyl ether-terminated perfluoropolyether of the general structure shown in EXAMPLE 1, but having a higher average molecular weight of about 3800 and m/n ratio of 0.5. A solution containing 1.10 g of the allyl ether, 0.0015 g of the platinum catalyst solution described in EXAMPLE 1, 0.03 g of DC-1107, and 12 ml of 1,1,2-trichlorotrifluoroethane was coated on a silica-titanium dioxide-primed poly(ethylene terephthalate) film using a No. 3 RDS rod. The coated film was heated at 100° C. for 3 min. After heat aging (70° C. for 3 days) of a laminate of the silicone adhesive test tape described in EXAMPLE 1, the peel force was 10–20 g/2.5 cm and the readhesion value was 1010–1060 g/2.5 cm.

EXAMPLE 6

This example demonstrates the performance of a coating obtained by use of a fluorine-containing polymethylhydrosiloxane. A solution containing 0.25 g of a trimethylsilyloxy end-capped linear fluorosilicone containing 46.9% fluorine and an average of eighteen $C_8F_{17}SO_2N(C_2H_5)(CH_2)_3Si(CH_3)O$—, and seventeen $CH_3SiHO$— siloxane units and having the general formula

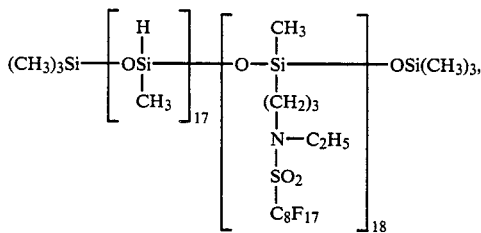

0.5 g of the allylamide end-capped perfluoropolyether described in EXAMPLE 3, 0.001 g of the platinum catalyst solution described in EXAMPLE 1, and 15 ml of 1,1,2-trichlorotrifluoroethane was coated on a poly(vinylidene chloride)-primed poly(ethylene terephthalate) film using a No. 3 RDS rod. The film was heated at 90° C. for 5 min. The peel force of a laminate of the silicone adhesive test tape described in EXAMPLE 1, was 110–170 g/2.5 cm and the readhesion value was 1010–1060 g/2.5 cm.

EXAMPLES 7–11

These Examples (Table 1) demonstrate that the properties of the cured release coating can be varied by changing the ethylenically-unsaturated perfluoropolyether/polyorganohydrosiloxane weight ratio used in the coating formulation. Weight ratios of 93/7 to 97/3 were examined. In these experiments, the allyl ether-terminated perfluoropolyether, the polymethylhydrosiloxane fluid and the platinum catalyst (200 ppm platinum) described in EXAMPLE 1 were used. The release coatings (0.5 micrometer thickness) were obtained by casting solutions of the above components (6 wt%) in 1,1,2-trichlorotrifluoroethane on silica-titanium dioxide primed poly(ethylene terephthalate) films followed by curing of the coatings at 95° C. for 5 min. The peel force of laminates prepared from the silicone adhesive test tape described in EXAMPLE 1, and the readhesion values are given in Table 1.

TABLE 1

Release Performance with Poly(dimethylsiloxane) Adhesive

| Example | PPE-A[a]/Silicone hydride[b], weight ratio | Peel force | Readhesion (glass) |
|---|---|---|---|
| | | \multicolumn{2}{c}{After heat aging[c], g/2.5 cm} |
| 7 | 93/7 | 330–390 | 900–950 |
| 8 | 94/6 | 140–170 | 1050–1070 |
| 9 | 95/5 | 60–90 | 1170–1230 |
| 10 | 96/4 | 17–20 | 1170–1230 |
| 11 | 97/3 | 5–10 | 900–930 |

[a]PPE-A represents the allyl ether-terminated perfluoropolyether described in EXAMPLE 1.
[b]The silicone hydride was a trimethylsilyloxy-terminated polymethylhydrosiloxane having an average of 35 —Si(CH_3)HO— siloxane units.
[c]70° C. for 24 hr.

EXAMPLE 12

A release liner composed of the cured release coating of the allyl ether-terminated perfluoropolyether, described in EXAMPLE 1, on a silica-titanium dioxide primed poly(ethylene terephthalate) film was prepared using the procedures described in EXAMPLE 1. The side of the liner containing the release coating was coated (200 micrometers thick) with a solution of 18 weight percent of a silicone adhesive (DC-355, Dow Corning) in 1,1,2-trichlorotrifluoroethane using a knife coater. The adhesive-coated liner was allowed to dry at 25° C. for 20 hr. and then the adhesive side was laminated with an unprimed poly(ethylene terephthalate) film by pressing between two rubber rollers. The initial peel force required to separate the unprimed polyester film, containing the adhesive, from the release liner was 5–15 g/2.5 cm. After heat aging of a laminate at 70° C. (7 days), the peel force was 20–30 g/2.5 cm and the readhesion value (glass) was 1400–1460 g/2.5 cm. For comparison, the adhesion of the silicone adhesive prior to contact with the release coating was determined to be 1680–1800 g/2.5 cm.

EXAMPLE 13

This example shows the preparation of a silicone adhesive transfer tape containing perfluoropolyether release coatings. The allyl ether-terminated perfluoropolyether, polymethylhydrosiloxane fluid (DC-1107) and platinum catalyst, described in EXAMPLE 1, are used in the release coating formulation. The coating solution contains 145 g of allyl ether-terminated perfluoropolyether, 5.3 g of DC-1107, 0.2 g of the platinum catalyst solution, and 1.5 liter of 1,1,2-trichlorotrifluoroethane. A 15 cm×200 meter roll of a silica-titanium dioxide primed poly(ethylene terephthalate) film (primed on only one side) is coated on one side with the above solution using a 200 line rotogravure coater and cured by passing the coated film through an oven at 120° C. for 10 minutes. The article then is coated on the other side with the same solution and cured under similar conditions giving a release liner having a cured perfluoropolyether release coating having a thickness of about one micrometer on both sides of the substrate. An 18 percent by weight solution of a silicone pressure sensitive adhesive (DC-355, Dow Corning) in 1,1,2-trichloro-2,2,1-trifluoroethane is knife-coated onto the release coating on the unprimed surface. The adhesive-coated liner is allowed to air-dry after which time it can be rolled upon itself to form a jumbo which can be slit into smaller rolled tapes as desired. On unrolling the tape, the adhesive adheres to the release coating that had been coated on the unprimed surface of the polyester substrate. After contact of the adhesive side of a portion of the unwound tape to a clean glass surface using a rubber roller, the release of the liner containing the perfluoropolyether release coating is easily achieved resulting in the complete transfer of the silicone adhesive to the glass surface.

Various modifications and alterations of this invention will become apparent to those skilled in the art without departing from the scope and spirit of this invention, and it should be understood that this invention is not to be unduly limited to the illustrative embodiments set forth herein.

I claim:

1. A composition of matter comprising:
   (1) a polyorganohydrosiloxane comprising at least two hydrogen atoms attached to silicon atoms and no more than two hydrogen atoms on any one silicon atom and a number average molecular weight of from 106 to 50,000;
   (2) an ethylenically-unsaturated perfluoropolyether monomer having segments comprising a plurality of repeating units of —$C_aF_{2a}O$— in which "a" in each unit independently is an integer of 1 to 4, and at least one ethylenically-unsaturated group; and
   (3) an effective amount of a hydrosilation catalyst for bringing about the condensation of said polyorganohydrosiloxane and said ethylenically-unsaturated perfluoropolyether monomer.

2. The composition according to claim 1 wherein said polyorganohydrosiloxane has a formula selected from

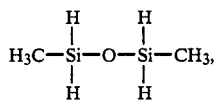
I $(R_2SiO)_b$,   II and

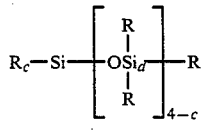
III wherein
each R is independently hydrogen or a substituted or unsubstituted organic group selected from linear alkyl groups having 1 to 12 carbon atoms, branched alkyl or cycloalkyl groups having 3 to 7 carbons in a ring, alkoxyalkyl groups having 1 to 3 carbons in the alkoxy group, and phenyl groups, the groups substituting the organic group being selected from one or more halogen, $C_1$ to $C_4$ alkyl groups, trifluoroalkyl, alkyl- and fluoroalkylcarbonyl-amido and alkyl- and fluoroalkyl-sulfonamido groups in which the alkyl group is linear, branched, or cyclic having one to 18 carbon atoms; and at least two but not more than 70 percent of all R groups are hydrogen; b is an integer having a value of 3 to 18; c has a value of 0, 1, 2, or 3; and d is an integer having a value of 1 to 300.

3. The composition according to claim 2 wherein said organic group is methyl.

4. The composition according to claim 3 wherein said polyorganohydrosiloxane is selected from the group consisting of 1,3-dimethyldisiloxane, 1,1,3,3-tetramethyldisiloxane, tetramethylcyclotetrasiloxane, and linear polymethylhydrosiloxanes having the structure:

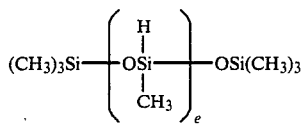

wherein e is an integer having a value of about 5 to 300.

5. The composition according to claim 1 wherein said ethylenically-unsaturated perfluoropolyether monomer has the formula $Q_gX(C_aF_{2a}O)_fC_aF_{2a}Z$ wherein
Q is an ethylenically-unsaturated group having the formula

in which $R^1$ and $R^2$ are independently hydrogen, alkyl, phenyl, phenylalkyl, or alkylphenyl in which alkyl has 1 to 4 carbon atoms and is linear branched or cyclic;

g is an integer having a value of 1 or 2;

X is a polyvalent linking group linking one or two Q groups to a perfluoropolyether segment, X is divalent when g is one and trivalent when g is two;

$(C_aF_{2a}O)_fC_aF_{2a}$ is a perfluoropolyether segment comprising a chain of f units, $(C_aF_{2a}O)$, in which "a" in each unit is independently an integer of 1 to 4 and f is a number having a value of at least two; and Z is —$OC_aF_{2a+1}$ or —$XQ_g$ in which a, X, Q and g are as defined above.

6. The composition according to claim 5 wherein $R^1$ and $R^2$ are hydrogen.

7. The composition according to claim 5 wherein X is selected from:

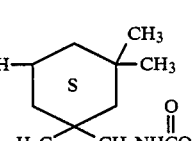

-continued

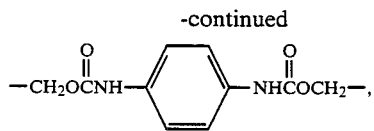

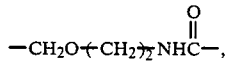

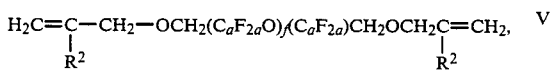   V

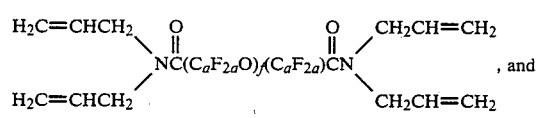, and

   VIII

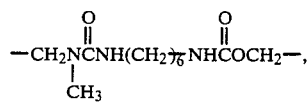

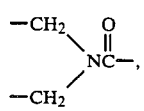

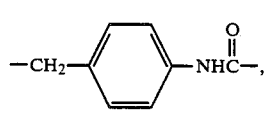

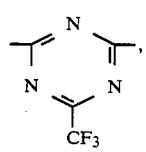

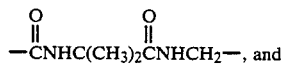

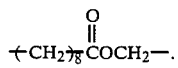

8. The composition according to claim 5 wherein X is selected from

—CH$_2$OCH$_2$—,

-continued

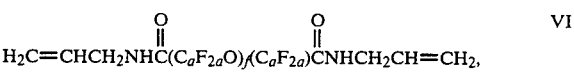

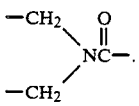

9. The composition according to claim 5 wherein said ethylenically-unsaturated perfluoropolyether monomer is selected from $$H_2C=CHCH_2NH\overset{O}{\overset{\|}{C}}(C_aF_{2a}O)_f(C_aF_{2a})\overset{O}{\overset{\|}{C}}NHCH_2CH=CH_2,$$   VI

VII wherein a, R$^2$, and f are as defined in claim 5, and wherein m and n are numbers designating the number of perfluoroethyleneoxy and perfluoromethyleneoxy repeating units randomly distributed in a chain, respectively, m and n independently have values from 1 to 300 and the ratio m/n is 0.2/1 to 5/1.

10. The composition according to claim 1 wherein said catalyst contains platinum and provides 1 to 200 parts by weight of platinum per one million parts by weight of perfluoropolyether monomer.

11. The composition according to claim 1 further comprising at least one of release modifiers, hydrosilation inhibitors, dyes, pigments, and reinforcing fillers.

12. The cured composition according to claim 1.

13. A process for providing a substrate with a low energy surface comprising the steps of:
(a) coating the composition according to claim 1 onto a substrate, and
(b) curing the coated composition by exposing the coated substate to heat or actinic radiation to provide said low energy surface.

14. The process according to claim 13 wherein said composition further comprises a halogen-containing organic solvent.

15. The process according to claim 13 wherein said curing takes place at a temperature in the range of 25° to 150° C.

16. The process according to claim 13 wherein said exposure to heat or actinic radiation is maintained for a period of time in the range of a fraction of a second to five minutes or more.

17. An article comprising:
a. a substrate, and
b. coated on at least one surface thereof a cured composition of matter comprising:
(1) a polyorganohydrosiloxane comprising at least two hydrogen atoms attached to silicon atoms and no more than two hydrogen atoms on any one silicon atom and a number average molecular weight of from 106 to 50,000;
(2) an ethylenically-unsaturated perfluoropolyether monomer having segments comprising repeating units of —C$_a$F$_{2a}$O— in which "a" in each independently is an integer of 1 to 4, and at least one ethylenically-unsaturated group; and (3) an effective amount of a hydrosilation catalyst for bringing about the condensation of said polyorganohydrosiloxane and said ethylenically-unsaturated perfluoropolyether monomer.

18. The article according to claim 17 further comprising a primer layer between said substrate and said cured composition.

19. The article according to claim 18 wherein said primar layer is a hydrated oxide selected from hydrated silica, alumina, tungsten oxide, ferric oxide, titanium oxide, or combinations thereof.

20. The article according to claim 18 wherein said primer layer is silica-titanium dioxide.

21. The article according to claim 17 wherein said substrate is a flexible sheet material.

22. The article according to claim 17 further comprising a layer of pressure-sensitive adhesive.

23. The article according to claim 22 wherein said pressure-sensitive adhesive is a silicone adhesive.

24. An article prepared by the method according to claim 16.

25. The article according to claim 22 wherein said article is a transfer tape.

26. The article according to claim 17 wherein said substrate bears on each surface thereof said cured composition, the composition on at least one of said surfaces being modified so as to provide an adhesive release differential, wherein said article is a differential release liner for adhesive material.

* * * * *

UNITED STATES PATENT AND TRADEMARK OFFICE
CERTIFICATE OF CORRECTION

PATENT NO. : 4,565,714
DATED : January 21, 1986
INVENTOR(S) : Robert J. Koshar

It is certified that error appears in the above-identified patent and that said Letters Patent is hereby corrected as shown below:

Col. 3, lines 50 to 55, delete the structural formula and insert therefor

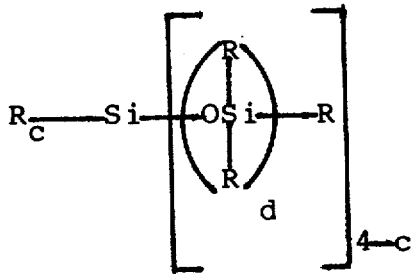

Col. 17, lines 41 to 45, delete the structural formula and insert therefor

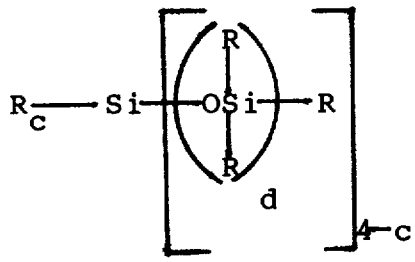

Signed and Sealed this

Fourth Day of November, 1986

[SEAL]

Attest:

DONALD J. QUIGG

*Attesting Officer*      Commissioner of Patents and Trademarks

US004565714B1

REEXAMINATION CERTIFICATE (3794th)

United States Patent [19]
Koshar

[11] B1 4,565,714
[45] Certificate Issued: Jun. 29, 1999

[54] LOW SURFACE ENERGY MATERIAL

[75] Inventor: Robert J. Koshar, Mahtomedi, Minn.

[73] Assignee: Minnesota Mining and Manufacturing Company, St. Paul, Minn.

Reexamination Requests:
No. 90/004,480, Dec. 10, 1996
No. 90/004,738, Aug. 19, 1997

Reexamination Certificate for:
Patent No.: 4,565,714
Issued: Jan. 21, 1986
Appl. No.: 06/620,438
Filed: Jun. 14, 1984

Certificate of Correction issued Nov. 4, 1986.

[51] Int. Cl.$^6$ ............................................. B05D 3/06
[52] U.S. Cl. ........................ 427/515; 427/387; 428/447; 528/15; 528/25; 528/26; 528/27; 528/31; 528/28; 522/172

[58] Field of Search ................................ 528/25, 26, 27, 528/28, 15, 31; 204/159.13; 427/54.1, 36, 35, 387; 428/447

[56] References Cited

U.S. PATENT DOCUMENTS 3,188,299  6/1965  Chalk ........................................ 528/15
3,542,830  11/1970  Kim et al. .
4,100,136  7/1978  Carter et al. .

*Primary Examiner*—Melvyn I. Marquis

[57] ABSTRACT

A low surface energy material is a hydrosilation reaction product of an ethylenically-unsaturated perfluoropolyether with a compound containing silicon-bonded hydrogen. A substrate bearing the low surface energy coating of the invention can be used in low-adhesion articles, for example, in adhesive tapes, for cooking utensils, ice-release for aircraft, or for magnetic recording media.

B1 4,565,714

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–4, 7–9, 18–20, 22–23, 25 and 26 is confirmed.

Claims 1, 5–6, 10–17, 21 and 24 are cancelled.

New claims 27–58 are added and determined to be patentable.

27. A composition of matter comprising:
(1) a polyorganohydrosiloxane comprising at least two hydrogen atoms attached to silicon atoms and no more than two hydrogen atoms on any one silicon atom and a number average molecular weight of from 106 to 50,000;
(2) an ethylenically-unsaturated perfluoropolyether monomer having segments comprising a plurality of repeating units of —$C_aF_{2a}O$— in which "a" in each unit independently is an integer of 1 to 4; and the total number of carbon atoms in the plurality of repeating units is at least 18, and at least one ethylenically-unsaturated group; and
(3) an effective amount of a hydrosilation catalyst for bringing about the condensation of said polyorganohydrosiloxane and said ethylenically-unsaturated perfluoropolyether monomer.

28. A composition of matter comprising:
(1) a polyorganohydrosiloxane comprising at least two hydrogen atoms attached to silicon atoms and no more than two hydrogen atoms on any one silicon atom and a number average molecular weight of from 106 to 50,000;
(2) an ethylenically-unsaturated perfluoropolyether monomer having segments comprising a plurality of repeating units of —$C_aF_{2a}O$— in which "a" in each unit independently is an integer of 1 to 4, and at least one ethylenically-unsaturated group, wherein the plurality of repeating units of —$C_aF_{2a}O$—are linked to the ethylenically-unsaturated group by a polyvalent linking group that is silicon-free; and
(3) an effective amount of a hydrosilation catalyst for bringing about the condensation of said polyorganohydrosiloxane and said ethylenically-unsaturated perfluoropolyether monomer.

29. A composition of matter comprising:
(1) a polyorganohydrosiloxane comprising at least two hydrogen atoms attached to silicon atoms and no more than two hydrogen atoms on any one silicon atom and a number average molecular weight of from 106 to 50,000;
(2) an ethylenically-unsaturated perfluoropolyether monomer having segments comprising a plurality of repeating units of —$C_aF_{2a}O$— in which "a" in each unit independently is an integer of 1 to 4, and at least one ethylenically-unsaturated group, wherein the plurality of repeating units of —$C_aF_{2a}O$—are linked to the ethylenically-unsaturated group by a polyvalent linking group composed of atoms selected from carbon, hydrogen, oxygen, and nitrogen; and
(3) an effective amount of a hydrosilation catalyst for bringing about the condensation of said polyorganohydrosiloxane and said ethylenically-unsaturated perfluoropolyether monomer.

30. A composition of matter comprising:
(1) a polyorganohydrosiloxane comprising at least two hydrogen atoms attached to silicon atoms and no more than two hydrogen atoms on any one silicon atom and a number average molecular weight of from 106 to 50,000, with the proviso that the polyorganohydrosiloxane is fluorine-free;
(2) an ethylenically-unsaturated perfluoropolyether monomer having segments comprising a plurality of repeating units of —$C_aF_{2a}O$— in which "a" in each unit independently is an integer of 1 to 4, and at least one ethylenically-unsaturated group; and
(3) an effective amount of a hydrosilation catalyst for bringing about the condensation of said polyorganohydrosiloxane and said ethylenically-unsaturated perfluoropolyether monomer.

31. A release coating comprising a composition according to any one of claims 1, 27, or 28–30.

32. The composition according to one of claims 27 or 28–30 further comprising at least one of release modifiers, hydrosilation inhibitors, dyes, pigments, and reinforcing fillers.

33. A cured composition according to one of claims 27 or 28–30.

34. An article comprising:
a. a substrate, and
b. coated on at least one surface thereof a cured composition of matter comprising the composition of any one of claims 27 or 28–30.

35. The composition according to claim 1 further comprising a release modifier.

36. The composition according to claim 35, wherein the release modifier comprises 0.1 to 10 parts of the composition.

37. The composition according to claim 35, wherein the release modifier provides a differential release of at least 10 percent.

38. A composition of matter comprising:
(1) a polyorganohydrosiloxane comprising at least two hydrogen atoms attached to silicon atoms and no more than two hydrogen atoms on any one silicon atom and a number average molecular weight of from 106 to 50,000;
(2) an ethylenically-unsaturated perfluoropolyether monomer having ($C_aF_{2a}O$)$_f$$C_aF_{2a}$ segments comprising a plurality of repeating units of —$C_aF_{2a}O$— in which "a" in each unit independently is an integer of 1 to 4; and the total number of carbon atoms in the ($C_aF_{2a}O$)$_f$$C_aF_{2a}$ segments is at least 25, and at least one ethylenically-unsaturated group; and
(3) an effective amount of a hydrosilation catalyst for bringing about the condensation of said polyorganohydrosiloxane and said ethylenically-unsaturated perfluoropolyether monomer.

39. The composition according to one of claims 27, 28–30, or 35–38, wherein said ethylenically-unsaturated perfluoropolyether monomer has the formula:

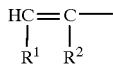

wherein Q is an ethylenically-unsaturated group having the formula:

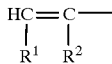

in which $R^1$ and $R^2$ are independently hydrogen, alkyl, phenyl, phenylalkyl, or alkylphenyl in which alkyl has 1 to 4 carbon atoms and is linear, branched, or cyclic;

g is an integer having a value of 1 or 2;

X is a polyvalent linking group linking one or two Q groups to a perfluoropolyether segment, X is divalent when g is one and trivalent when g is two; $(C_aF_{2a}O)_fC_aF_{2a}$ is a perfluoropolyether segment comprising a chain of f units, $(C_aF_{2a}O)$, in which "a" in each unit is independently an integer of 1 to 4 and f is a number having a value of at least two; and Z is $-OC_aF_{2a+1}$ or $-XQ_g$ in which a, X, Q and g are as defined above.

40. The composition according to claim 39 wherein $R^1$ and $R^2$ are hydrogen.

41. A process for providing a substrate with a low energy surface comprising the steps of:
(a) coating the composition according to one of claims 27, 28–30 or 35–38 onto a substrate, and
(b) curing the coated composition by exposing the coated substrate to heat or actinic radiation to provide said low energy surface.

42. The process according to claim 41, wherein said composition further comprises a halogen-containing organic solvent.

43. The process according to claim 41 wherein said curing takes place at a temperature in the range of 25° C. to 150° C.

44. The process according to claim 41 wherein said exposure to heat or actinic radiation is maintained for a period of time in the range of a fraction of a second to five minutes or more.

45. The article according to claim 34, wherein said substrate is a flexible sheet material.

46. An article prepared by the process according to claim 43.

47. The article of claim 34, wherein the article is a low surface energy liner.

48. The low surface energy liner of claim 47, wherein release performance of the liner toward adhesives using a 180° peel test is in the range of about 5 to 900 grams per 2.5 centimeter of width.

49. The composition according to claim 31 further comprising at least one of release modifiers, hydrosilation inhibitors, dyes, pigments, and reinforcing fillers.

50. A cured composition according to claim 31.

51. A cured composition according to claim 32.

52. An article comprising:
a. a substrate, and
b. coated on at least one surface thereof a cured composition of matter comprising the composition of claim 31.

53. An article comprising:
a. a substrate, and
b. coated on at least one surface thereof a cured composition of matter comprising the composition of claim 32.

54. The composition according to claim 31, wherein said ethylenically-unsaturated perfluoropolyether monomer has the formula:

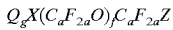

wherein Q is an ethylenically-unsaturated group having the formula:

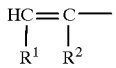

in which $R^1$ and $R^2$ are independently hydrogen, alkyl, phenyl, phenylalkyl, or alkylphenyl in which alkyl has 1 to 4 carbon atoms and is linear, branched, or cyclic;

g is an integer having a value of 1 or 2;

X is a polyvalent linking group linking one or two Q groups to a perfluoropolyether segment, X is divalent when g is one and trivalent when g is two; $(C_aF_{2a}O)_fC_aF_{2a}$ is a perfluoropolyether segment comprising a chain of f units, $(C_aF_{2a}O)$, in which "a" in each unit is independently an integer of 1 to 4 and f is a number having a value of at least two; and Z is $-OC_aF_{2a+1}$ or $-XQ_g$ in which a, X, Q and g are as defined above.

55. The composition according to claim 32, wherein said ethylenically-unsaturated perfluoropolyether monomer has the formula:

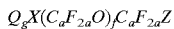

wherein Q is an ethylenically-unsaturated group having the formula:

HC═C—
| |
R¹ R² in which $R^1$ and $R^2$ are independently hydrogen, alkyl, phenyl, phenylalkyl, or alkylphenyl in which alkyl has 1 to 4 carbon atoms and is linear, branched, or cyclic;

g is an integer having a value of 1 or 2;

X is a polyvalent linking group linking one or two Q groups to a perfluoropolyether segment, X is divalent when g is one and trivalent when g is two; $(C_aF_{2a}O)_fC_aF_{2a}$ is a perfluoropolyether segment comprising a chain of f units, $(C_aF_{2a}O)$, in which "a" in each unit is independently an integer of 1 to 4 and f is a number having a value of at least two; and Z is $-OC_aF_{2a+1}$ or $-XQ_g$ in which a, X, Q and g are as defined above.

56. A process for providing a substrate with a low energy surface comprising the steps of:
(a) coating the composition according to claim 31 onto a substrate, and
(b) curing the coated composition by exposing the coated substrate to heat or actinic radiation to provide said low energy surface.

57. A process for providing a substrate with a low energy surface comprising the steps of:

(a) coating the composition according to claim 32 onto a substrate, and (b) curing the coated composition by exposing the coated substrate to heat or actinic radiation to provide said low energy surface.

58. A process for providing a substrate with a low energy surface comprising the steps of:

(a) coating the composition according to claim 39 onto a substrate, and (b) curing the coated composition by exposing the coated substrate to heat or actinic radiation to provide said low energy surface.

\* \* \* \* \*